E. LANDIS.
Velocipede.
No. 29,288.  Patented July 24, 1860.
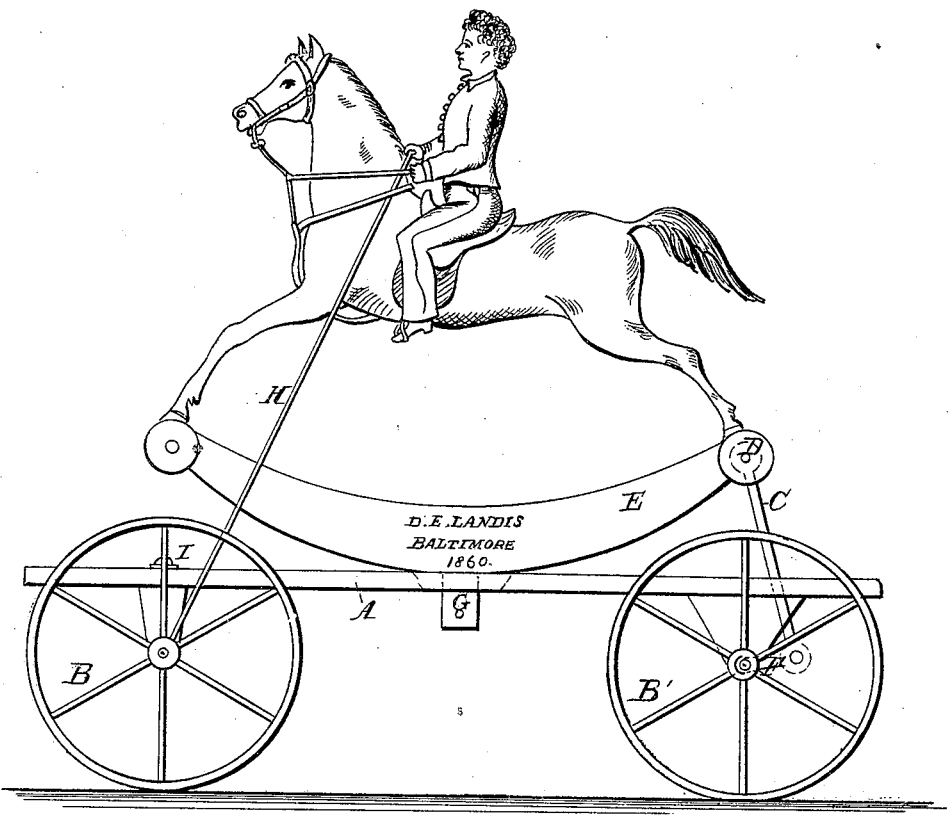
Witnesses:
Wm. B. Kinley
Saml. McClintock
Inventor:
Edw. Landis

UNITED STATES PATENT OFFICE.

EDMUND LANDIS, OF BALTIMORE, MARYLAND.

ROCKING PROPELLER.

Specification of Letters Patent No. 29,288, dated July 24, 1860.

*To all whom it may concern:*

Be it known that I, EDMUND LANDIS, of Baltimore, in the State of Maryland, have invented certain new and useful Improvements in Rocking Propellers; and I do hereby declare that the following is a full, clear, and exact description of the same, reference being had to the accompanying drawings and to the letters of reference marked thereon.

The nature of my invention consists in securing a hobby horse, upon a carriage with wheels and connecting the two in such a manner that the rocking of the horse will propel the carriage as will be hereinafter described.

In the annexed drawing which is a side view of my invention A, represents a carriage platform mounted on wheels B, B'. Upon the platform, a horse mounted upon rockers E, is placed and the rockers or the connecting piece between the rockers is connected to the axle of one set of wheels (either the front or back) by means of a pitman c. The axle to which the pitman is attached will be a crank axle as represented at F.

G represents tenons projecting through mortises in the platform A for steadying the horse and preventing its becoming displaced when in motion.

H represents reins which are attached to the front axles, for the purpose of guiding the machine.

It will be readily seen that when the horse rocks backward and forward the pitman c, will communicate a rotary motion to the crank F, and to the wheels B', and thus propel the machine. The gravity of the body of a man or boy moving to and fro or vibrating upon the horse will give ample power to the crank to propel the machine, with power sufficient to run it readily up hill as well as upon level ground. I may attach the pitman nearer to the center of gravity of the hobby horse and thus gain power, or I may attach it where it is now seen—and I may use gearing for giving a more rapid motion to the crank and wheels at each movement of the horse.

Having thus fully described my invention, what I claim as new, and desire to secure by Letters Patent, is—

The arrangement of the rockers (E) with the wheels, B', the connecting rod c, the crank F, and platform A, so that the motion produced by the rocking is converted into a rotary motion to propel the whole machine substantially as and for the purpose specified.

EDM. LANDIS.

Witnesses:
C. M. ALEXANDER,
A. A. YEATMAN.